(12) United States Patent
Schloegel et al.

(10) Patent No.: US 8,666,114 B2
(45) Date of Patent: Mar. 4, 2014

(54) SYSTEM AND METHOD FOR GEOSPATIAL PARTITIONING OF A GEOGRAPHICAL REGION

(75) Inventors: Kirk Schloegel, Minneapolis, MN (US); Valerie Guralnik, Mound, MN (US); Scott McCloskey, Minneapolis, MN (US); Ben Miller, Minneapolis, MN (US)

(73) Assignee: Honeywell International Inc., Morristown, NJ (US)

(*) Notice: Subject to any disclaimer, the term of this patent is extended or adjusted under 35 U.S.C. 154(b) by 199 days.

(21) Appl. No.: 13/308,711

(22) Filed: Dec. 1, 2011

(65) Prior Publication Data
US 2013/0142438 A1   Jun. 6, 2013

(51) Int. Cl.
*G06K 9/00* (2006.01)

(52) U.S. Cl.
USPC ............ 382/103; 382/104; 382/113; 382/173

(58) Field of Classification Search
None
See application file for complete search history.

(56) References Cited

U.S. PATENT DOCUMENTS

| | | | |
|---|---|---|---|
| 2007/0003138 A1* | 1/2007 | Hobson et al. | 382/173 |
| 2011/0182517 A1 | 7/2011 | Farsiu et al. | |
| 2011/0221769 A1 | 9/2011 | Leung et al. | |
| 2012/0275701 A1* | 11/2012 | Park et al. | 382/173 |

OTHER PUBLICATIONS

Vioix et al., "Spatial and Spectral Methods for Weed Detection and Localization", EURASIP Journal on Applied Signal Processing 2002:7, pp. 679-685, 2002.*

Haris, "Hybrid Image Segmentation Using Watersheds and Fast Region Merging", IEEE Transactions on Image Processing, vol. 7, No. 12, Dec. 1998, pp. 1684-1699.*

Trevedi et al., "Low-Level Segmentation of Aerial Images with Fuzzy Clustering", IEEE Transactions on Systems, Man, and Cybernetics, vol. SMC-16, No. 4, Jul./Aug. 1986, pp. 589-598.*

Ramin Zabih, et al., "Spatially Coherent Clustering Using Graph Cuts", pp. 1-8.

Yuri Boykov, et al., "Markov Random Fields with Efficient Approximations", 8 pages, Computer Science Department, Cornell University, Ithaca, New York.

Yuri Boykov, et al., "Fast Approximate Energy Minimization via Graph Cuts", IEEE Transactions on Pattern Analysis and Machine Intelligence, vol. 23, No. 11, Nov. 2001, pp. 1222-1239.

Yuri Boykov, et al., "A New Bayesian Framework for Object Recognition", 7 pages, Computer Science Department, Cornell University, Ithaca, New York.

Ashish Raj, et al., "Bayesian Parallel Imaging with Edge-Preserving Priors", Magnetic Resonance in Medicine, vol. 57, 2007, pp. 8-21.

Junhwan Kim, et al., "Visual Correspondence Using Energy Minimization and Mutual Information", pp. 1-8, Computer Science Department, Cornell University, Ithaca, New York.

(Continued)

*Primary Examiner* — Brian P Werner

(57) ABSTRACT

An apparatus includes at least one memory unit and at least one processing unit. The memory unit is configured to receive and store information associated with a particular geographical region. The processing unit configured to execute a computer program for discretizing an image of the geographical region into a plurality of sub-regions. Using these sub-regions, the processing unit may generate a graph comprising a plurality of nodes and a plurality of edges in which the nodes comprise the sub-regions. The processing unit may also geospatially partition an image of the geographical region according to the information that is associated with each of the sub-regions.

20 Claims, 4 Drawing Sheets

(56) References Cited

OTHER PUBLICATIONS

Vladimir Kolmogorov, et al., "Multi-camera Scene Reconstruction via Graph Cuts", pp. 1-16, Computer Science Departement, Cornell University, Ithaca, New York.

Vladimir Kolmogorov, et al., "Generalized Multi-camera Scene Reconstruction Using Graph Cuts", pp. 1-16, Computer Science Department, Cornell University, Ithaca, New York.

Vladimir Kolmogorov, et al., "Computing Visual Correspondence with Occlusions via Graph Cuts", pp. 1-37, Computer Science Department, Cornell University, Ithaca, New York.

Junhwan Kim, et al., "A Segmentation Algorithm for Contrast-Enhanced Images", pp. 1-8, Computer Science Department, Cornell University, Ithaca, New York.

Vladimir Kolmogorov, et al., "What Energy Functions Can Be Minimized via Graph Cuts?", IEEE Transactions on Pattern Analysis and Machine Intelligence, vol. 26, No. 2, Feb. 2004, pp. 147-159.

Ashish Raj, et al., "A Maximum Likelihood Approach to Parallel Imaging With Coil Sensitivity Noise", IEEE Transactions on Medical Imaging, pp. 1-22.

Combined Search and Examination Report dated Mar. 20, 2013 in connection with United Kingdom Application No. GB1217396.9, 4 pages.

Steven T. Smith, et al., "Network Discovery Using Wide-Area Surveillance Data", Proc of the 14th Int Conf on Information Fusion, IEEE, May 7, 2011, 8 pages.

Pierre Soille, "Constrained Connectivity for Hierarchical Image Partitioning and Simplification", Trans on pattern analysis and machine intelligence, IEEE, USA, Jan. 7, 2008, pp. 1132-1145.

\* cited by examiner

SYSTEM AND METHOD FOR GEOSPATIAL PARTITIONING OF A GEOGRAPHICAL REGION

GOVERNMENT RIGHTS

This invention was made with government support under Contract No. HR0011-10-C-0112 awarded by the Defense Advanced Research Projects Agency (DARPA). The government has certain rights in the invention.

TECHNICAL FIELD

This disclosure relates generally to data mining systems. More specifically, this disclosure relates to a system and method for geospatial partitioning of a geographical region.

BACKGROUND

Reconnaissance has become an important military defense activity for determining threats that may exist in a theater of battle. In many cases, reconnaissance may be provided by one or more types of sensors, such as video cameras, synthetic aperture radars (SARs), forward-looking infrared light (FLIR) devices, and other devices that detect movement or positions of potential targets in a particular geographical region. As wide-area persistent sensors, such as the Autonomous Realtime Ground Ubiquitous Surveillance-Imaging System (ARGUS-IS), continue to proliferate, it has become increasingly important to automatically and scalably analyze massive amounts of resulting data produced by these systems.

SUMMARY

This disclosure provides a system and method for geospatial partitioning of a geographical region.

In a first embodiment, an apparatus includes at least one memory unit configured to store an image of a geographical region. The apparatus also includes at least one processing unit configured to discretize the image into multiple sub-regions, generate a graph having multiple nodes and multiple edges, and geospatially partition the geographical region using the graph. The nodes represent the sub-regions, and the edges couple related nodes.

In a second embodiment, a method includes discretizing an image of a geographical region into multiple sub-regions. The method also includes generating a graph having multiple nodes and multiple edges. The nodes represent the sub-regions, and the edges couple related nodes. The method further includes geospatially partitioning the geographical region using the graph.

In a third embodiment, a computer readable medium embodies a computer program. The computer program includes computer readable program code for discretizing an image of a geographical region into multiple sub-regions. The computer program also includes computer readable program code for generating a graph having multiple nodes and multiple edges. The nodes represent the sub-regions, and the edges couple related nodes. The computer program further includes computer readable program code for geospatially partitioning the geographical region using the graph.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device(s) or system(s).

Figure 1:
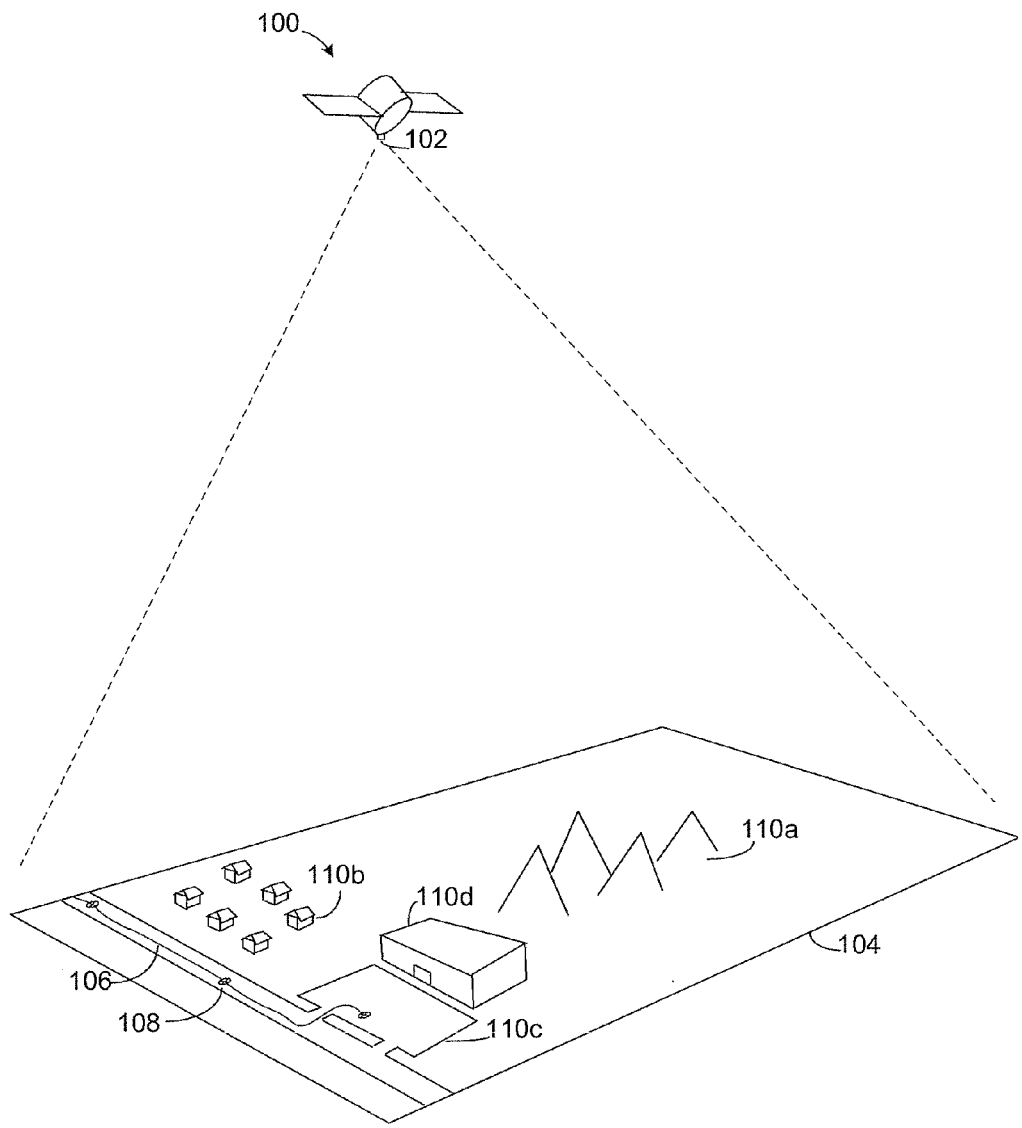
FIG. 1 illustrates an example geospatial partitioning system according to this disclosure.

FIG. 1 illustrates an example geospatial partitioning system 100 according to this disclosure. As shown in FIG. 1, one or more sensors 102 acquire information associated with a geographical region 104. This particular geographical region includes several features, such as one or more tracks 106 associated with a corresponding one or more targets 108 in the geographical region 104. The geographical region 104 also includes a mountain range 110a, a neighborhood of houses 110b, and a parking lot 110c next to a store 110d.

The system 100 uses acquired information to partition the geographical region 104 according to one or more constraints. For example, the system 100 partitions the geographical region 104 by identifying the tracks 106 and any events associated with one or more tracks 106 using information acquired from the sensors 102. Each track 106 generally refers to a course or path of a moving target 108 through a geographical region, and each event generally refers to an observable occurrence of interest. The system 100 may geospatially partition sub-regions of the geographical region 104 based upon similarity of aggregated sensor results and/or domain-specific constraints that are associated with these sub-regions. An example of an aggregated sensor result may include the average number of tracks 106 detected in a region over a certain time period. Another example of an aggregated sensor result is the change in velocity of the tracks 106 detected in a region for a certain time period. An example of a domain-specific constraint is that all of the discovered regions must be spatially contiguous. Another example of a domain-specific constraint is that the average heading of the internally-detected tracks 106 may differ by no more than a specified change for all regions in the same partition.

In some embodiments, the geospatial partitioning provided by the system 100 may provide intelligence analysts with an intuitive map to visualize various aggregated sensor results. Results may also be used as inputs to other types of analyses, such as event detection, anomaly detection, activity detection, or nodal and node-network detection. That is, once geospatial partitioned regions of the geographical region 104 have been identified, the system 100 may determine anomalies in the acquired information. For example, information associated with an urban geographical region may be gathered over a period of time to determine one or more features, such as parking lots, roadways, or other constraining features like creeks, rivers, or streams that may limit movement of targets 108 in the geographical region 104. Once these features are determined, abnormal behavior of a particular target 108 may be detected and further mined to determine potential threats, such as placement of improvised explosive devices (IEDs) or other types of activities.

In the example system 100 shown in FIG. 1, the sensors 102 include a camera that acquires visible imagery of the geographical region 104. However, the system 100 could use any other or additional type(s) of sensor(s) to acquire information having geospatial characteristics. For example, the sensors 102 may include a visible sensor such as the ARGUS-IS device. As another example, the sensors 102 may include a synthetic aperture radar (SAR) that acquires information associated with the geographical region 104 using high-frequency electro-magnetic energy emanating from objects in the geographical region 104. As yet another example, the sensors 102 may include differing types of sensors, such as one or more video cameras that obtain visual imagery of the geographical region 104 and one or more radio-frequency (RF) sensors that monitor the position or other intelligence about wireless communications conducted in the geographical region 104.

Although FIG. 1 illustrates one example of a geospatial partitioning system 100, various changes may be made to FIG. 1. For example, although the sensor 102 is shown as being positioned on a satellite, a sensor 102 could be positioned on any platform (such as an aircraft) or fixedly mounted on a structure (such as a tower). As another example, although one example geographical region 104 having a particular terrain is shown, other types of terrains, such as wilderness regions, undeveloped regions, urban regions, or suburban regions may be partitioned according to the teachings of this disclosure. Additionally, information acquired by the sensor 102 may include three-dimensional (3D) geospatial information such that the geographical region 104 may be partitioned according to 3D space, including height and/or depth dimensional aspects.

Figure 2A:
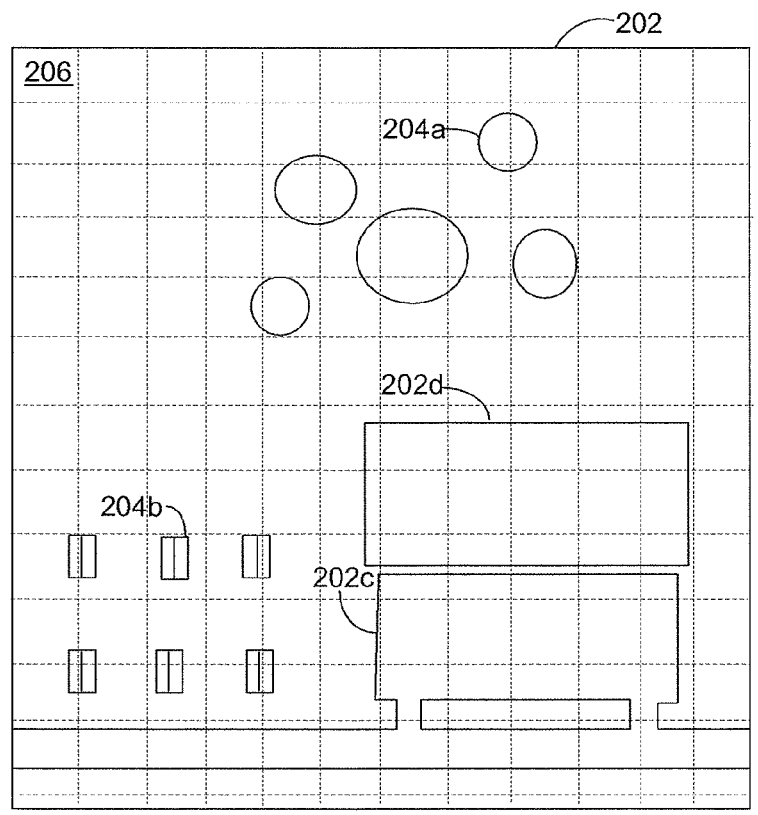
FIGS. 2A and 2B illustrate example images that may be processed by a geospatial partitioning system according to this disclosure.
Figure 2B:
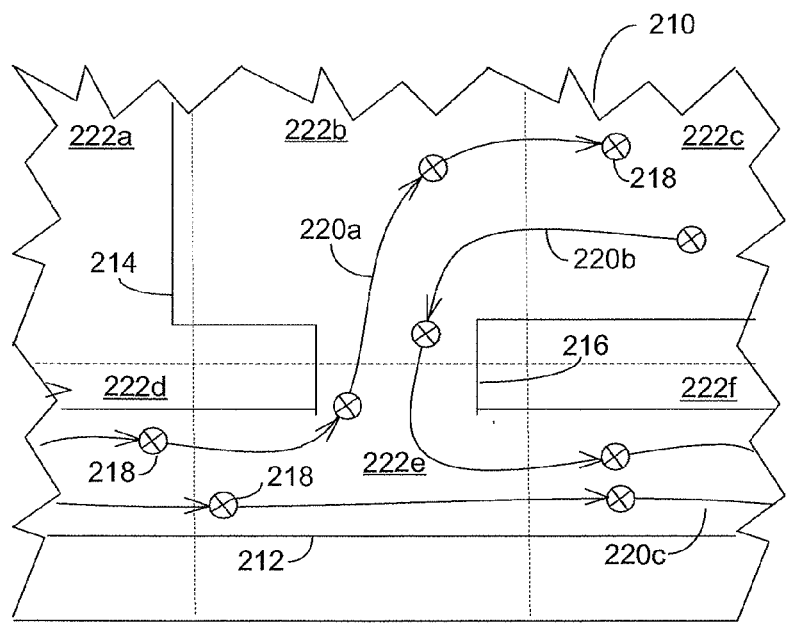

FIGS. 2A and 2B illustrate example images that may be processed by the geospatial partitioning system 100 according to this disclosure. FIG. 2A illustrates an image 202 representing the geographical region 104 shown in FIG. 1. The image 202 includes imagery 204a of the mountain range 110a, imagery 204b of the neighborhood of houses 110b, imagery 204c of the parking lot 110c, and imagery 204d of the store 110d.

The image 202 may be discretized by dividing the geographical region 104 into an n×m grid of sub-regions 206, such as rectangular sub-regions. The sub-regions 206 are contiguously aligned and form potential boundaries that may be determined when the geographical region 104 is partitioned by the system 100. In some cases, the grid may be formed over the image 202 such that the sub-regions 206 have a relatively equal size and shape. In other cases, the grid may be formed over the image 202 such that the sub-regions 206 are individually sized according to objectives of the system 100. In still other embodiments, the image 202 may be discretized by dividing the geographical region 104 into an n×m×o grid to form a 3D space. The grid may include any suitable level of granularity. For example, the image 202 may be divided such that each sub-region 206 covers a 20×20 meter region at a 1 meter ground sample distance (GSD) such that each sub-region 206 includes an array of approximately 20×20 pixels. Other embodiments of the geographical partitioning system 100 may form grids having sub-regions 206 greater or less than 20×20 meters in size, and having GSDs greater or less than 1 meter.

FIG. 2B illustrates an enlarged portion 210 of the example image 202 in FIG. 2A. This particular portion 210 includes imagery 212 of a roadway, imagery 214 of a parking lot, and imagery 216 of a joining entrance way. In some cases, the boundaries of the roadway, parking lot, and entrance way may not be easily discernable by merely viewing information provided by a sensor 102. That is, the information provided by a sensor 102 may not provide visual imagery from which topographical features such as roadways and parking lots may be easily ascertained. As a particular example, a sensor 102 may provide information other than photographic imagery, such as imagery provided by a synthetic aperture radar (SAR), which may or may not provide sufficient visual detail of topographical features. Additionally, features in the sensor information may be void of any visible pathways, such as infrared sensor information that may be used to monitor a target's movement within a house.

Also shown in FIG. 2B are several tracks associated with targets 218 in the image. Here, the tracks can identify pathways taken by certain targets 218 detected at differing time intervals. In this example, a track 220a indicates a target moving from the left and entering the parking lot via the entrance way. A track 220b indicates another target leaving the parking lot and traveling along the roadway to the right. A track 220c indicates yet another target moving along the roadway from the left to the right.

Although FIGS. 2A and 2B illustrate examples of images that may be processed by a geospatial partitioning system 100, various changes may be made to FIGS. 2A and 2B. For example, these images are associated with the geographical region 104 of FIG. 1, and any other geographical regions could be analyzed. Also, although only three tracks are shown, any number of tracks may be used for partitioning the geographical region 104. In addition, any other type(s) of terrain may be partitioned.

Figure 3:
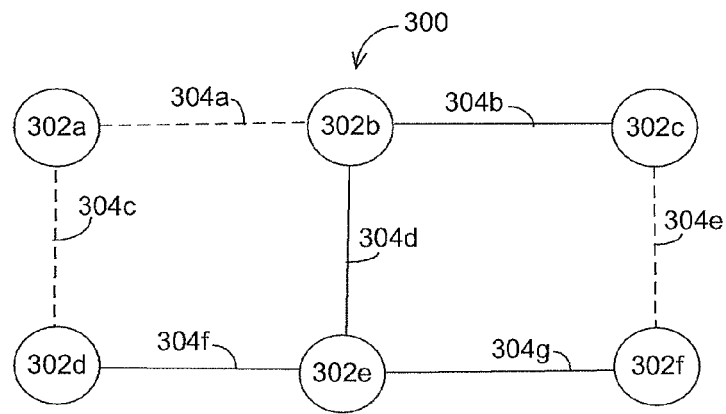
FIG. 3 illustrates an example graph that may be generated by a geographical partitioning system according to this disclosure.

FIG. 3 illustrates an example graph 300 that may be generated by the geographical partitioning system 100 according to this disclosure. The graph 300 includes nodes 302a-302f representing sub-regions 206 of the geographical region 104 and edges 304a-304g defining relationships between adjacent sub-regions 206.

Each of the edges 304a-304g may include constraints that define conditions associated with the relationship of one node to another. For example, a particular edge between two nodes may represent a physical barrier, such as a wall or other obstacle that would normally hinder movement of a target from one sub-region 206 to another. As another example, an edge between two nodes may represent a pathway, such as a roadway or sidewalk, over which movement from one sub-region to another may be facilitated in a relatively easy manner. In the former case, the edge representing a physical barrier could have a relatively high constraint value, while the edge representing the pathway could have a relatively low constraint value.

The edges 304a-304g arranged between the nodes 302a-302f can also define various levels of relationships between the nodes. For example, an edge having a relatively high correlation value may indicate a strong similarity between the two adjacent nodes. In the example graph 300 shown, edges 304a-304g having a relatively high correlation value are shown as solid lines, and those having a relatively low correlation value are shown as dashed lines.

Among other things, the geospatial partitioning system 100 may assign correlation value to the edges using the tracks 220a-220c. For example, the geospatial partitioning system 100 may assign a relatively high correlation value to the edges 304b, 304d, 304f, and 304g because the tracks 220a-220c exhibit direct movement between sub-regions 206 associated with these tracks as shown in FIG. 2B. Conversely, the geospatial partitioning system 100 may assign a relatively low correlation value to the edges 304a, 304c, and 304e because none of the tracks 220a-220c exhibits any direct movement between their respective sub-regions 206 as shown in FIG. 2B. Provided with this information, the geospatial partitioning system 100 partitions the image 202 such that sub-regions 206 joined by edges 304b, 304d, 304f, and 304g having a relatively high correlation value may be combined with one another into a contiguous region having a relatively high degree of similarity. The geospatial partitioning system 100 also partitions the image 202 such that nodes 302a, 302c, and 302e having a relatively low correlation value are separated from one another to indicate a boundary between their respective sub-regions 206. All of the sub-regions 206 of the geographical region 104 may be processed with other contiguous sub-regions 206 in a similar manner to partition the image 202.

In some embodiments, the edges 304a-304g between the nodes 302a-302f may be adjustable so that the geospatial partitioning can be tailored according to various conditions, such as the quality of information obtained from the sensors 102, the intrinsic nature of the geographical terrain being processed, and/or knowledge obtained from other sources. For example, intelligence obtained from other sensors 102 may have determined that a social gathering has been slated for a particular time and place within the geographical region 104. In this case, constraints proximate to the meeting place may be weighted to a relatively higher level to account for the increased level of traffic during the identified time of the meeting. As another example, additional intelligence may indicate that a particular roadway is closed due to construction. In that case, constraints proximate to the closed roadway may be weighted to a relatively lower level to account for the reduced amount of traffic through the closed roadway.

The graph 300 may be augmented to capture aspects of the sensor data and domain-specific constraints in a number of ways. For example, a vector of weights may be associated with each edge 304a-304g. Each element of a vector may specify the similarity of a different subset of aggregated sensor results between any sub-regions that are associated with the two incident nodes. A user may select which subset of aggregated sensor results is represented. A second vector of weights that quantifies a subset of the domain-specific constraints between two sub-regions associated with the nodes may be associated with each edge. An example constraint between nodes may indicate that an obstacle exists between two sub-regions 206 (such as a river or border) represented by those nodes 304. A user may also select which subset of domain-specific constraints is represented. In addition, a vector of weights may be associated with each node that specifies other types of domain-specific constraints. An example of such a constraint is a weight-balance constraint. In this case, the partitioning can be computed that balances the weight(s) associated with each node across the partitioning.

In some embodiments, additional edges may be added to the graph. For example, if two sub-regions 206 that are not adjacent share particular types of properties, an additional edge may be inserted in the graph 300 between the two corresponding nodes. This edge may have an associated vector of weights to represent the similarity or constraints between the aggregated track, event, or other types of data detected in the associated sub-regions 206.

The graph 300 may also be pruned prior to geospatial partitioning. The graph 300 may be pruned by including only those nodes with at least one edge having one or more weights that meet or exceed one or more threshold value(s) while removing or pruning the remaining nodes. The edges may be pruned by including an edge only if both of its incident nodes are included in the pruned graph. In other embodiments, an edge may be included only if both of its incident nodes are included in the pruned graph and one or more of its weights meet or exceed threshold value(s).

The resulting pruned or original graph and the associated weight vectors may be used as inputs to a multi-objective, multi-constraint graph partitioning algorithm. In some embodiments, the graph may include different classes of clustering constraints that model multi-modal information having hard and soft cross-mode constraints as disclosed in U.S. patent application Ser. No. 12/862,289 entitled "A METHOD FOR CLUSTERING MULTI-MODAL DATA THAT CONTAIN HARD AND SOFT CROSS-MODE CONSTRAINTS" filed on Aug. 24, 2010 (which is hereby incorporated by reference).

If the graph 300 is pruned before geospatial partitioning, the resulting partitioning may be extended to include a subset of the nodes from the original unpruned graph. In this case, a greedy partition-growing algorithm may be used. The resulting partitioned graph may be smoothed by a local partition-refinement method, such as a modified version of the greedy Kernighan-Lin technique.

The resulting partitioned graph may be mapped back to geospatial coordinates of the associated sub-regions 206 to result in a geospatial partitioned space. In a dynamic scenario in which sensor data is streamed to the system 100, the graph 300 may be dynamically repartitioned by continually updating certain nodes, edge weights, and constraints of edges. After the graph 300 is updated, a multi-objective, multi-constraint graph repartitioning algorithm can be used to compute an updated geospatial partitioning while attempting to minimize the difference between the previous partitioning and the new partitioning. The new partitioning may be mapped back to geospatial coordinates of each corresponding sub-region 206 to result in a new geospatial partitioning.

Although FIG. 3 illustrates one example of a graph 300 that may be generated by the geographical partitioning system 100, various changes may be made to FIG. 3. For example, the content and arrangement of the graph 300 are for illustration only. Any other suitable graphs associated with any suitable geographical regions could be generated and used.

Figure 4:
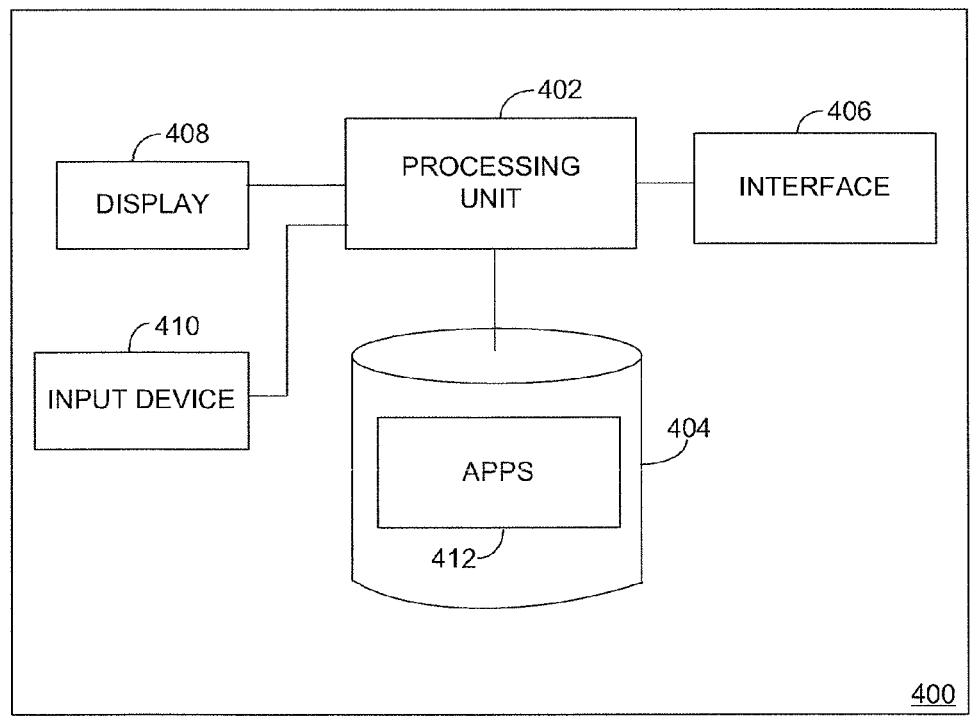
FIG. 4 illustrates an example geospatial partitioning apparatus according to this disclosure.

FIG. 4 illustrates an example geospatial partitioning apparatus 400 according to this disclosure. The partitioning apparatus 400 could be used, for example, in the system 100 of FIG. 1 to process data from the sensor 102. The partitioning apparatus 400 could be implemented at any suitable location(s), such as in a data center remote from the sensor 102.

As shown in FIG. 4, the partitioning apparatus 400 includes at least one processing unit 402, at least one memory unit 404, at least one interface 406, a display 408, and at least one input device 410. The processing unit 402 represents any suitable processing device(s), such as a microprocessor, microcontroller, digital signal processor, application-specific integrated circuit, field programmable gate array, or other logic device. The memory unit 404 represents any suitable volatile and/or non-volatile storage and retrieval device(s), such as random access or read-only memory. The interface 406 represents any suitable interface for facilitating communication over one or more networks, such as an Ethernet interface or other electrical signal line interface or a wireless interface. The interface 406 can be used to receive data from one or more sensors 102 or other data sources. The display 408 represents any suitable display device for presenting information to a user. The input device 410 represents any suitable device(s) for receiving input from a user, such as a keyboard or mouse.

In FIG. 4, the memory unit 404 includes at least one application 412. The application 412 represents one or more computer programs defining how the partitioning apparatus 400 partitions a geographical region 104. For example, the application 412 may include instructions for discretizing an image 202 of a geographical region 104, generating a graph 300 from the discretized image 202, and geospatially partitioning the image 202 of the geographical region 104 according to the information that is associated with each of the sub-regions 206.

Although FIG. 4 illustrates one example of a geospatial partitioning apparatus 400, various changes may be made to FIG. 4. For example, the apparatus 400 could include any other or additional components according to particular needs. Also, the apparatus 400 could be used to partition one or multiple geographical regions 104.

Figure 5:
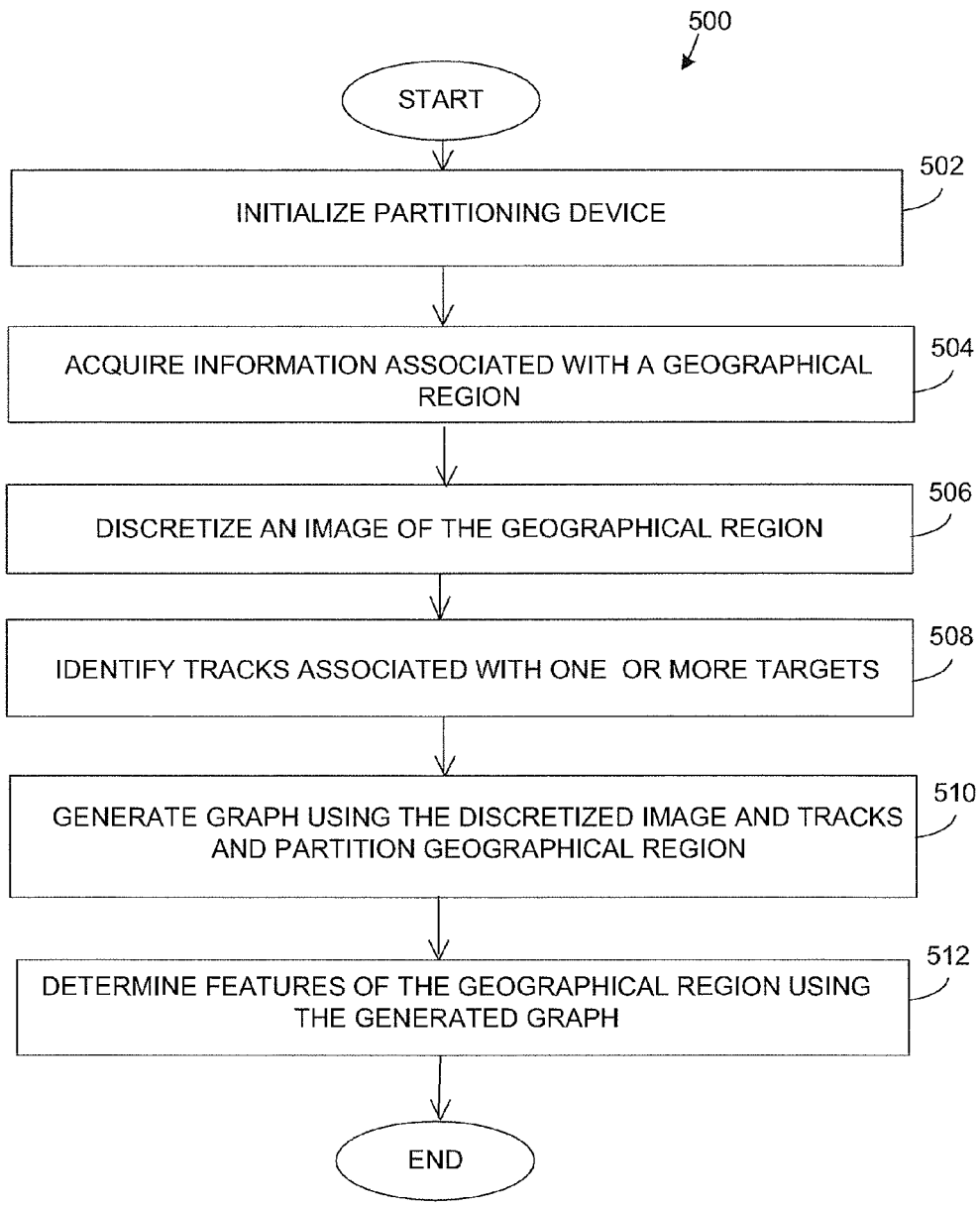
FIG. 5 illustrates an example method for geospatially partitioning information associated with a geographical region according to this disclosure.

FIG. 5 illustrates an example method 500 for geospatially partitioning information associated with a geographical region according to this disclosure. As shown in FIG. 5, a geographical partitioning device is initialized at step 502. This could include, for example, setting certain device settings according to the type of terrain whose imagery is to be partitioned in the apparatus 400.

Information associated with a geographical region is acquired at step 504. The information may include any content associated with geospatial characteristics. For example, the information may be tagged to particular coordinates of a geographical region, such as imagery obtained via a camera or other imaging technique. As another example, the information may concern a target whose geospatial characteristics are known. An example of such information may include the rank, status, or capabilities of a particular target being tracked within the geographical region 104. In particular embodiments, the information is acquired from a wide-area sensor, such as an ARGUS-IS device.

An image of the geographical region is discretized at step 506. The image may be discretized in any suitable manner to form multiple sub-regions 206 that are delineated from other sub-regions 206. In some embodiments, the image may be discretized into an m×n grid of rectangular sub-regions 206 that may or may not be equally sized. In other embodiments, the image may be discretized into an m×n×o grid of three dimensional sub-regions.

Tracks associated with one or more targets are identified at step 508. The tracks may be identified by quantizing acquired imagery to detect the targets 108 over a series of non-simultaneous time intervals. The targets 108 may be selected according to the objective of the process. For example, if a roadmap of a geographical region 104 is desired, vehicles may be selected as targets 108 due to their constraints of traveling over roadways. As another example, if activities within an enclosed building are desired, people who inhabit the building may be selected as targets 108.

A graph is generated in which sub-regions of the image are nodes and the edges represent similarities or constraints between the associated sub-regions at step 510. The geographical region 104 is partitioned by constructing two or more disjoint sets of related nodes of the graph 300 according to the similarities or constraints between the associated sub-regions 206. In some embodiments, nodes may be associated with weighting values according to one or more criteria. For example, nodes associated with certain sub-regions 206 may be weighted according to a priori knowledge about these sub-regions 206. As another example, the nodes representing certain sub-regions 206 may be weighted according to information about these sub-regions 206 or tracks acquired from other sources. Additionally, weighting values may be adjusted according to objectives or desired information to be obtained from the process. In some embodiments, additional weighting may be applied based on characteristics of the tracks, such as the speed, acceleration, and/or direction of the tracks.

One or more features of the geographical region are determined according to the geospatially-partitioned space at step 512. In some embodiments, the geospatially-partitioned space may be overlayed on a map of the geographical region 104. In other embodiments, additional tracks may be analyzed to determine any anomalous behavior with these tracks.

Although FIG. 5 illustrates one example of a method 500 for geospatially partitioning a geographical region, various changes may be made to FIG. 5. For example, while shown as a series of steps, various steps in FIG. 5 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with" and its derivatives mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   at least one memory device configured to store an image of a geographical region; and
   at least one processing device configured to:
   discretize the image into multiple sub-regions;
   generate a graph comprising multiple nodes and multiple edges, the nodes representing the sub-regions, the edges coupling related nodes in the graph; and
   geospatially partition the geographical region by constructing two or more disjoint sets of related nodes in the graph using one or more sets of aggregated data of one or more tracks that are detected in one or more sub-regions, the one or more tracks corresponding to one or more targets in the geographical region.

2. The apparatus of claim 1, wherein the at least one processing device is configured to determine one or more features of the geographical region using the geospatially partitioned region.

3. The apparatus of claim 2, wherein the one or more features comprise one or more anomalous behaviors of the one or more targets in the geographical region.

4. The apparatus of claim 1, wherein the at least one processing device is configured to discretize the image of the geographical region into a grid of rectangular sub-regions.

5. The apparatus of claim 1, wherein the at least one processing device is configured to generate the one or more tracks by identifying the one or more targets over a plurality of non-simultaneous time intervals.

6. The apparatus of claim 5, wherein the one or more tracks define at least one of: a speed, acceleration, and direction of travel for each target.

7. The apparatus of claim 1, wherein the at least one processing device is configured to adjust one or more weighting factors associated with the edges of the graph.

8. The apparatus of claim 1, wherein the at least one processing device is configured to overlay the geospatially partitioned region on a map of the geographical region.

9. The apparatus of claim 1, wherein the at least one processing device is configured to discretize the image of the geographical region into a grid of sub-regions within a three dimensional space.

10. A method comprising:
using one or more processing devices:
discretizing an image of a geographical region into multiple sub-regions;
generating a graph comprising multiple nodes and multiple edges, the nodes representing the sub-regions, the edges coupling related nodes in the graph; and
geospatially partitioning the geographical region by constructing two or more disjoint sets of related nodes in the graph using one or more sets of aggregated data of one or more tracks that are detected in one or more sub-regions, the one or more tracks corresponding to one or more targets in the geographical region.

11. The method of claim 10, further comprising:
determining one or more features of the geographical region using the geospatially partitioned region.

12. The method of claim 10, wherein discretizing the image comprises discretizing the image into a grid of rectangular sub-regions.

13. The method of caim 10, further comprising:
generating the one or more tracks by identifying the one or more targets over a plurality of non-simultaneous time intervals.

14. The method of claim 10, further comprising:
adjusting one or more weighting factors associated with one or more of the edges in the graph.

15. The method of claim 10, further comprising:
overlaying the geospatially partitioned region on a map of the geographical region.

16. The method of claim 10, wherein discretizing the image comprises discretizing the image into a grid of sub-regions within a three dimensional space.

17. A non-transitory computer readable medium embodying a computer program, the computer program comprising computer readable program code for:
discretizing an image of a geographical region into multiple sub-regions;
generating a graph comprising multiple nodes and multiple edges, the nodes representing the sub-regions, the edges coupling related nodes in the graph; and
geospatially partitioning the geographical region by constructing two or more disjoint sets of related nodes in the graph using one or more sets of aggregated data of one or more tracks that are detected in one or more sub-regions, the one or more tracks corresponding to one or more targets in the geographical region.

18. The computer readable medium of claim 17, wherein the computer program further comprises computer readable program code for generating the one or more tracks by identifying the one or more targets over a plurality of non-simultaneous time intervals.

19. The computer readable medium of claim 17, wherein the computer program further comprises computer readable program code for adjusting one or more weighting factors associated with the edges of the graph.

20. The computer readable medium of claim 17, wherein the computer program further comprises computer readable program code for overlaying the geospatially partitioned region on a map of the geographical region.

* * * * *